US011911918B2

(12) United States Patent
Tanaka et al.

(10) Patent No.: US 11,911,918 B2
(45) Date of Patent: Feb. 27, 2024

(54) DISTANCE-MEASURING SYSTEM AND DISTANCE-MEASURING METHOD

(71) Applicant: Panasonic Intellectual Property Management Co., Ltd., Osaka (JP)

(72) Inventors: Yasushi Tanaka, Osaka (JP); Akihiro Arai, Osaka (JP); Kenji Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 546 days.

(21) Appl. No.: 16/972,807

(22) PCT Filed: Jun. 7, 2019

(86) PCT No.: PCT/JP2019/022792
§ 371 (c)(1),
(2) Date: Dec. 7, 2020

(87) PCT Pub. No.: WO2019/240051
PCT Pub. Date: Dec. 19, 2019

(65) Prior Publication Data
US 2021/0245366 A1  Aug. 12, 2021

(30) Foreign Application Priority Data
Jun. 11, 2018  (JP) ................ 2018-110999

(51) Int. Cl.
*B25J 9/16* (2006.01)
*G01S 17/894* (2020.01)
(Continued)

(52) U.S. Cl.
CPC ........... *B25J 9/1697* (2013.01); *B25J 9/1664* (2013.01); *B25J 9/1676* (2013.01); *B25J 19/06* (2013.01);
(Continued)

(58) Field of Classification Search
CPC ...... B25J 9/1697; B25J 9/1664; B25J 9/1676; B25J 19/06; G01S 17/06; G01S 17/894;
(Continued)

(56) References Cited

U.S. PATENT DOCUMENTS

| | | | |
|---|---|---|---|
| 2008/0021597 A1* | 1/2008 | Merte ................ | F16P 3/144 700/255 |
| 2009/0043440 A1 | 2/2009 | Matsukawa et al. | |

(Continued)

FOREIGN PATENT DOCUMENTS

| | | | | |
|---|---|---|---|---|
| EP | 2023160 A1 * | 2/2009 | ............. | B25J 19/06 |
| EP | 2 395 274 | 12/2011 | | |

(Continued)

OTHER PUBLICATIONS

Extended European Search Report dated Jul. 7, 2021 in corresponding European Patent Application No. 19819434.2.

(Continued)

*Primary Examiner* — Abby Y Lin
*Assistant Examiner* — Dylan Brandon Mooney
(74) *Attorney, Agent, or Firm* — Wenderoth, Lind & Ponack, L.L.P.

(57) ABSTRACT

A distance-measuring system includes: a first ranging sensor; a second ranging sensor that covers a detection range more limited than a detection range covered by the first ranging sensor and has resolution higher than resolution of the first ranging sensor; and an image processing device. The image processing device includes: a machine detector that detects a position of a mobile machine, based on a first sensed result obtained by the first ranging sensor; a sensor controller that controls a detection position to be detected by the second ranging sensor to detect the position of the mobile machine which has been detected; and a safety
(Continued)

determiner that controls the mobile machine, based on a second sensed result obtained by the second ranging sensor.

15 Claims, 17 Drawing Sheets

(51) Int. Cl.
    *G01S 17/06*     (2006.01)
    *G01S 17/93*     (2020.01)
    *B25J 19/06*     (2006.01)

(52) U.S. Cl.
    CPC ............ *G01S 17/06* (2013.01); *G01S 17/894* (2020.01); *G01S 17/93* (2013.01); *G05B 2219/37631* (2013.01); *G05B 2219/40196* (2013.01); *G05B 2219/40202* (2013.01); *G05B 2219/40203* (2013.01); *G05B 2219/40298* (2013.01)

(58) Field of Classification Search
    CPC ........ G01S 17/93; G01S 7/4817; G01S 17/88; G01S 17/931; G01S 17/86; G01S 17/87; G05B 2219/37631; G05B 2219/40196; G05B 2219/40202; G05B 2219/40203; G05B 2219/40298; G05B 19/048; F16P 3/144; F16P 3/142
See application file for complete search history.

(56) References Cited

U.S. PATENT DOCUMENTS

| 2009/0222134 | A1 | 9/2009 | Franke et al. |
| 2011/0298579 | A1* | 12/2011 | Hardegger ................ F16P 3/14 340/3.1 |
| 2012/0095575 | A1* | 4/2012 | Meinherz ............... B25J 9/1676 700/83 |
| 2015/0217455 | A1* | 8/2015 | Kikkeri ................. G06T 7/0004 700/259 |
| 2015/0334371 | A1* | 11/2015 | Galera ................... G06V 20/56 348/46 |
| 2017/0169627 | A1* | 6/2017 | Kim ....................... G01S 13/862 |

FOREIGN PATENT DOCUMENTS

| JP | 5283622 | 9/2013 |
| JP | 2017-181279 | 10/2017 |
| WO | 2008/014909 | 2/2008 |

OTHER PUBLICATIONS

International Search Report (ISR) dated Aug. 13, 2019 in International (PCT) Application No. PCT/JP2019/022792.

* cited by examiner

DISTANCE-MEASURING SYSTEM AND DISTANCE-MEASURING METHOD

TECHNICAL FIELD

This disclosure relates to a distance-measuring system and a distance-measuring method.

BACKGROUND ART

For ensuring human safety against mobile machines such as robot arms, there are systems that control, for instance, stop, the mobile machines when people come closer to the mobile machines (for example, Patent Literature (PTL) 1).

CITATION LIST

Patent Literature

[PTL 1] Japanese Patent No. 5283622

SUMMARY OF INVENTION

Technical Problem

In such systems, adjustment processing needs to be performed on sensors etc. when the systems are initialized or when the mobile machines move.

In view of the above, the present disclosure aims to provide a distance-measuring system or a distance-measuring method that can simplify the adjustment processing.

Solution to Problem

A distance-measuring system according to an aspect of the present disclosure includes: a first ranging sensor; a second ranging sensor that covers a detection range more limited than a detection range covered by the first ranging sensor and has resolution higher than resolution of the first ranging sensor; and an image processing device. The image processing device includes: a machine detector that detects a position of a mobile machine, based on a first sensed result obtained by the first ranging sensor; a sensor controller that controls a detection position to be detected by the second ranging sensor to detect the position of the mobile machine which has been detected; and a controller that controls the mobile machine, based on a second sensed result obtained by the second ranging sensor.

Advantageous Effects of Invention

The present disclosure can provide a distance-measuring system or a distance-measuring method that can simplify adjustment processing.

DESCRIPTION OF EMBODIMENTS

Figure 1:
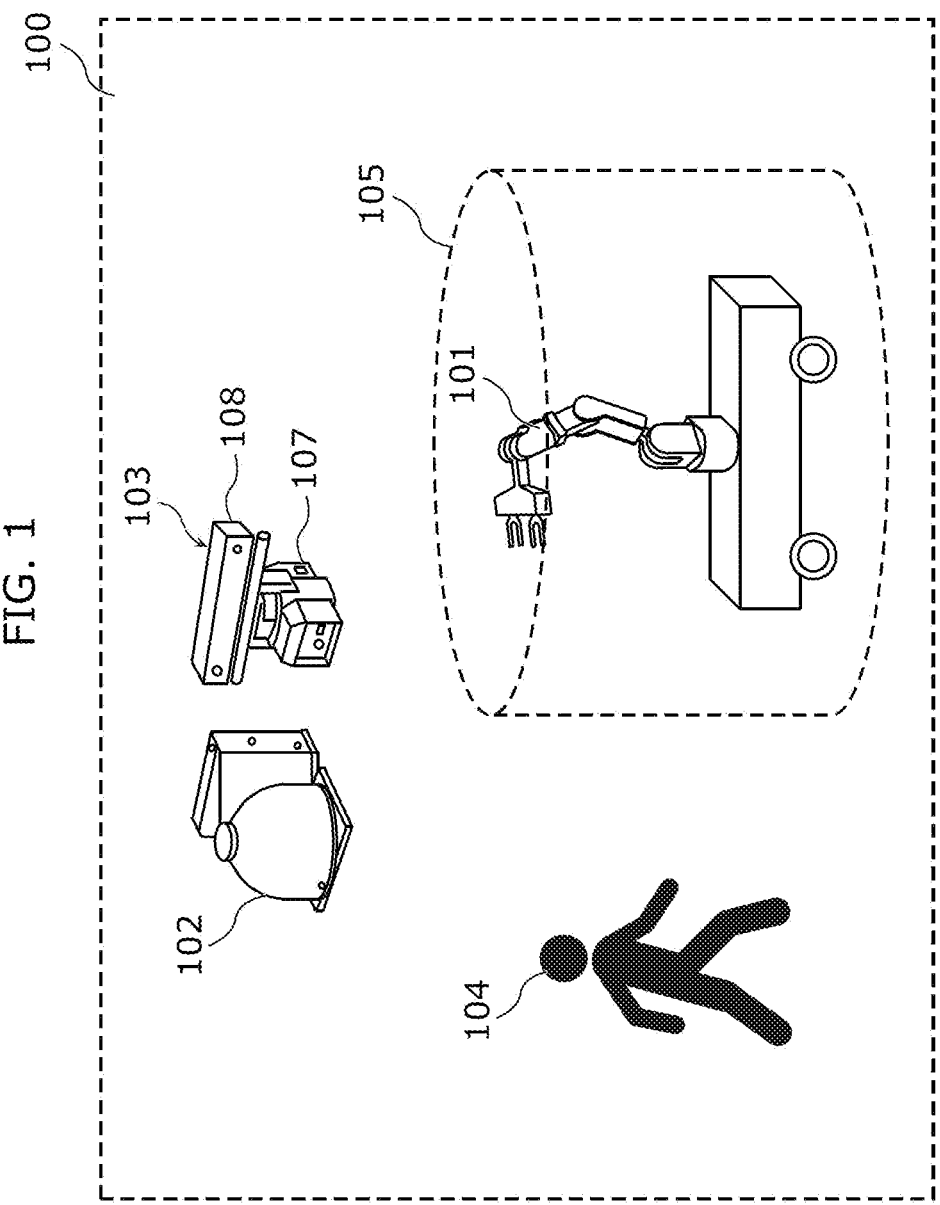
FIG. 1 is a diagram schematically illustrating a configuration of a distance-measuring system according to Embodiment 1.

A distance-measuring system according to an aspect of the present disclosure includes: a first ranging sensor; a second ranging sensor that covers a detection range more limited than a detection range covered by the first ranging sensor and has resolution higher than resolution of the first ranging sensor; and an image processing device. The image processing device includes: a machine detector that detects a position of a mobile machine, based on a first sensed result obtained by the first ranging sensor; a sensor controller that controls a detection position to be detected by the second ranging sensor to detect the position of the mobile machine which has been detected; and a controller that controls the mobile machine, based on a second sensed result obtained by the second ranging sensor.

With this, the distance-measuring system can automatically adjust, using a sensed result obtained by the first ranging sensor, a detection position to be detected by the second ranging sensor. Therefore, adjustment processing that is performed, for example, when the system is initialized or when the mobile machine moves can be simplified.

For example, the controller may detect a first distance between the mobile machine and a person, based on the second sensed result, and when the first distance is less than a first value that is predetermined, may change operation of the mobile machine.

With this, the distance-measuring system can improve the safety of a person by controlling a mobile machine when the person comes closer to the mobile machine.

For example, when the first distance is less than the first value, the controller may (i) stop the mobile machine, (ii) slow down the mobile machine, or (iii) change a movable range of the mobile machine.

With this, the distance-measuring system can improve the safety of a person when the person comes closer to a mobile machine.

For example, the controller may detect the first distance, based on the first sensed result and the second sensed result.

With this, it is possible to improve the accuracy of detecting a mobile machine and a person.

For example, the controller may select, based on a degree of reliability of the first sensed result and a degree of reliability of the second sensed result, one of the first sensed result and the second sensed result, and may detect the first distance, based on selected one of the first sensed result and the second sensed result.

For example, the controller may detect, based on the first sensed result, a second distance between the mobile machine and the person, and may change operation of the mobile machine, based on the first distance and the second distance.

With this, it is possible to improve the accuracy of a determination.

For example, the second sensed result comprises a plurality of second sensed results, the plurality of second sensed results being a plurality of frames, and the controller may predict a traveling direction of the person, based on the plurality of frames, and may change operation of the mobile machine, based on the first distance and the traveling direction of the person which has been predicted.

With this, it is possible to improve the accuracy of a determination.

For example, the second sensed result comprises a plurality of second sensed results, the plurality of second sensed results being a plurality of frames, and the controller may predict a traveling direction of the mobile machine, based on the plurality of frames, and may change operation of the mobile machine, based on the first distance and the traveling direction of the mobile machine which has been predicted.

With this, it is possible to improve the accuracy of a determination.

For example, the controller may correct the first distance, based on control information of the mobile machine, and may change operation of the mobile machine, based on the first distance corrected.

With this, it is possible to improve the accuracy of a determination.

For example, the image processing device may further include a moving body detector that detects a position of a moving body, based on the first sensed result, and the sensor controller may control, based on the position of the mobile machine which has been detected and the position of the moving body which has been detected, the detection position to be detected by the second ranging sensor.

With this, it is possible to readily detect a person since a detection position to be detected by the second ranging sensor can be controlled according to the position of the person.

For example, the machine detector may detect, based on the first sensed result, the position of the mobile machine that is movable.

For example, the distance-measuring system may further include a light that illuminates a range in which a distance from the mobile machine is less than the first value.

With this, it is possible to make a region, in which a person is detected when the person comes closer to a mobile machine, visible. Accordingly, it is possible to readily adjust the first ranging sensor or the second ranging sensor.

For example, the light may illuminate the range when a moving body enters a detection range covered by the first ranging sensor.

With this, it is possible to reduce the decrease in the rate of operation of the mobile machine.

A distance-measuring method according to an aspect of the present disclosure includes: detecting a position of a mobile machine, based on a first sensed result obtained by a first ranging sensor; controlling a detection position to be detected by a second ranging sensor to detect the position of the mobile machine which has been detected, the second ranging sensor covering a detection range more limited than a detection range covered by the first ranging sensor and having resolution higher than resolution of the first ranging sensor; and controlling the mobile machine, based on a second sensed result obtained by the second ranging sensor.

With this, the distance-measuring method can automatically adjust, using a sensed result obtained by the first ranging sensor, a detection position to be detected by the second ranging sensor. Therefore, adjustment processing that is performed, for example, when the system is initialized or when the mobile machine moves can be simplified.

These general and specific aspects may be implemented using a system, a method, an integrated circuit, a computer program, a computer-readable recording medium such as a CD-ROM, or any combination of systems, methods, integrated circuits, computer programs, or computer-readable recording media.

Hereinafter, embodiments will be described in detail with reference to drawings. Note that the embodiments described below each show a specific example of the present disclosure. The numerical values, shapes, materials, elements, the arrangement and connection of the elements, steps, order of the steps, etc. indicated in the following embodiments are mere examples, and therefore are not intended to limit the scope of the present disclosure. Therefore, among elements in the following embodiments, those not recited in any one of the broadest, independent claims are described as optional elements.

Embodiment 1

Using a sensed result obtained by a first ranging sensor that covers an extensive detection range, a distance-measuring system according to an embodiment automatically adjusts a detection position to be detected by a second ranging sensor that covers a limited detection range although the second ranging sensor is a high-precision sensor. With this, it is possible to simplify adjustment processing performed when a mobile machine moves.

First, a schematic configuration of distance-measuring system 100 according to the embodiment will be described. FIG. 1 is a diagram schematically illustrating a configuration of distance-measuring system 100. Distance-measuring system 100 includes mobile machine 101, first ranging sensor 102, and second ranging sensor 103.

Mobile machine 101 is a robot such as a robot arm. In addition, mobile machine 101 is movable. For example, mobile machine 101 has a truck, and mobile machine 101 moves by being pushed by person 104. It should be noted that mobile machine 101 may have a moving mechanism and may autonomously move according to direct or remote control, for example.

First ranging sensor 102 is a sensor that detects a distance between a subject present within a detection range and first ranging sensor 102. Second ranging sensor 103 is a sensor that detects a distance between a subject present within a detection range and second ranging sensor 103. For example, first ranging sensor 102 and second ranging sensor 103 are fixedly installed. In addition, second ranging sensor 103 has precision higher than precision of first ranging sensor 102, although second ranging sensor 103 covers a detection range more limited than a detection range covered by first ranging sensor 102. Here, precision indicates, for example, resolution. Specifically, precision means at least one of spatial resolution and temporal resolution (frame rate). In addition, the spatial resolution means at least one of resolution (resolving power) in a range direction and resolution in a planar direction.

First ranging sensor 102 is, for example, a three-dimensional light detection and ranging (LiDAR) sensor. Second ranging sensor 103 is, for example, a time of flight (TOF) sensor. In addition, second ranging sensor 103 includes pan head 107 and sensor unit 108 installed on pan head 107. Pan head 107 allows panning, tilting, and zooming operations. With this, it is possible to change a detection range to be covered by second ranging sensor 103.

It should be noted that sensor types of first ranging sensor 102 and second ranging sensor 103 are not limited to the above-described combination so long as first ranging sensor 102 covers a detection range more extensive than a detection range covered by second ranging sensor 103 and second ranging sensor 103 has precision higher than precision of first ranging sensor 102.

In addition, distance-measuring system 100 detects that person 104 has come closer to mobile machine 101. For example, distance-measuring system 100 detects, using a sensed result obtained by second ranging sensor 103 with high precision, whether person 104 has entered restricted area 105 in which mobile machine 101 is present. When person 104 is detected within restricted area 105, distance-measuring system 100 restricts or stops operation of mobile machine 101. With this, it is possible to improve the safety of person 104.

On the other hand, since second ranging sensor 103 covers a limited detection range, mobile machine 101 may be out of the detection range covered by second ranging sensor 103 when mobile machine 101 moves. In this case, the detection range covered by second ranging sensor 103 needs to be adjusted.

In this embodiment, the detection range to be covered by second ranging sensor 103 is adjusted using a sensed result obtained by first ranging sensor 102 that can cover an extensive area. With this, it is possible to automatically perform the above-described adjustment.

Figure 2:
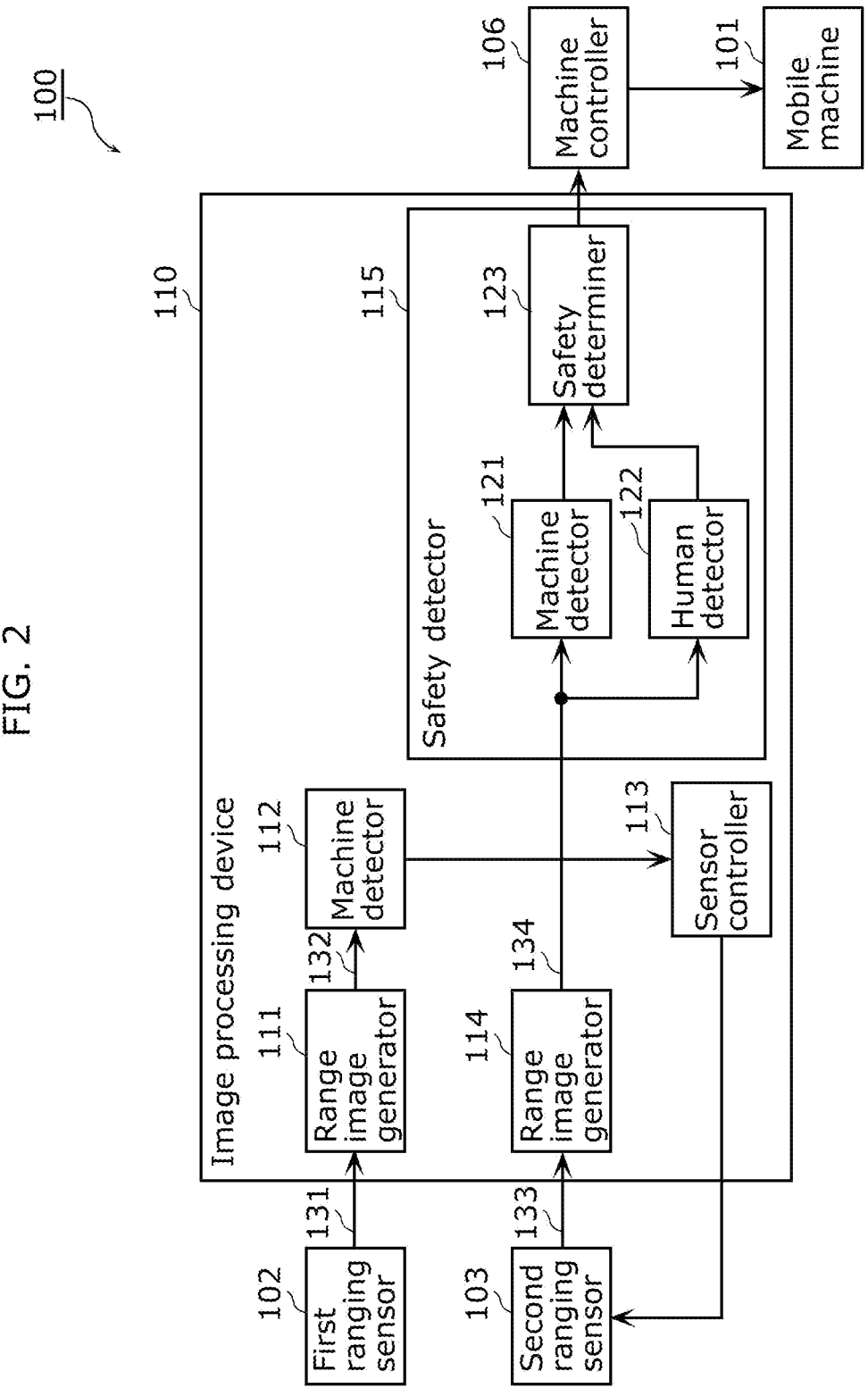
FIG. 2 is a block diagram illustrating the distance-measuring system according to Embodiment 1.

Hereinafter, details of this distance-measuring system 100 will be described. FIG. 2 is a block diagram illustrating distance-measuring system 100. As illustrated in FIG. 2, distance-measuring system 100 further includes machine controller 106 and image processing device 110.

Image processing device 110 includes range image generator 111, machine detector 112, sensor controller 113, range image generator 114, and safety detector 115.

Range image generator 111 generates first range image 132 from first sensed result 131 obtained by first ranging sensor 102. Machine detector 112 detects the position (three-dimensional position) of mobile machine 101, based on first range image 132.

Sensor controller 113 controls the detection position (detection range) to be detected by second ranging sensor 103, based on the position of mobile machine 101 which is detected by machine detector 112. Specifically, sensor controller 113 controls the detection position to be detected by second ranging sensor 103 so as to detect the detected position of mobile machine 101. For example, sensor controller 113 controls second ranging sensor 103 such that the position of mobile machine 101 is included in a detection range to be covered by second ranging sensor 103.

Range image generator 114 generates second range image 134 from second sensed result 133 obtained by second ranging sensor 103.

Safety detector 115 controls mobile machine 101 via machine controller 106, based on second sensed result 133 obtained by second ranging sensor 103. Specifically, safety detector 115 detects a first distance between mobile machine 101 and person 104, based on second sensed result 133, and changes operation of mobile machine 101 when the first distance is less than a predetermined first value. For example, when the first distance is less than the first value, safety detector 115 (i) stops mobile machine 101, (ii) slows down mobile machine 101, or (iii) changes (limits) a movable range of mobile machine 101. Here, the first value indicates a distance necessary for preventing mobile machine 101 and person 104 from colliding or contacting each other.

This safety detector 115 includes machine detector 121, human detector 122, and safety determiner 123. Machine detector 121 detects, using second range image 134, the position (three-dimensional position) of mobile machine 101. Human detector 122 detects, using second range image 134, the position (three-dimensional position) of person 104.

Safety determiner 123 determines safety based on the detected position of mobile machine 101 and the detected position of person 104. Specifically, safety determiner 123 detects the first distance between mobile machine 101 and person 104, based on the position of mobile machine 101 and the position of person 104. Safety determiner 123 determines that the distance between mobile machine 101 and person 104 is unsafe when the detected first distance is less than the predetermined first value. In addition, when safety determiner 123 determines that the distance between mobile machine 101 and person 104 is unsafe, safety determiner 123 controls operation of mobile machine 101 via machine controller 106.

Hereinafter, operation of distance-measuring system 100 will be described. Operation of distance-measuring system 100 includes (i) adjustment processing that changes, based on first sensed result 131 obtained by first ranging sensor 102, a detection position to be detected by second ranging sensor 103, and (ii) safety assessment processing that determines safety based on second sensed result 133 obtained by second ranging sensor 103 on which the adjustment processing has been performed.

Figure 3:
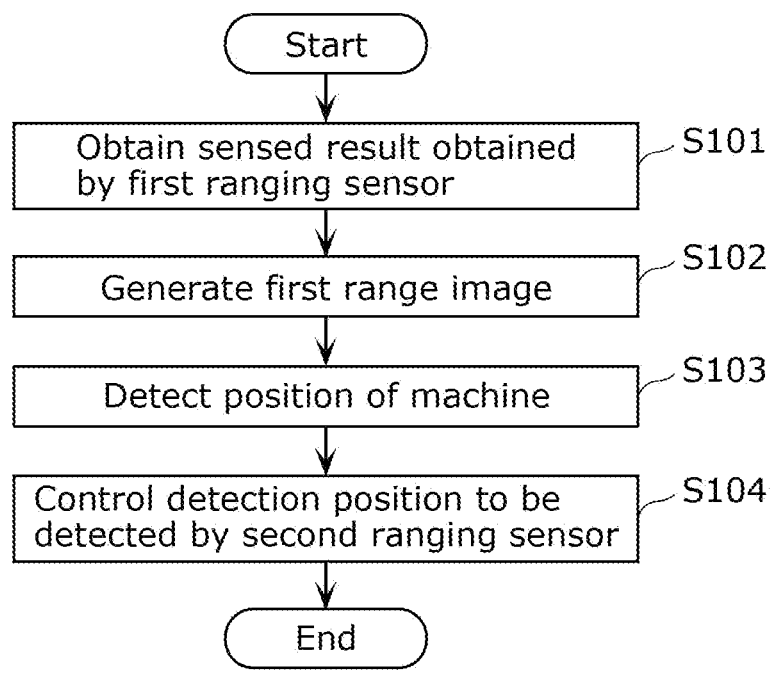
FIG. 3 is a flowchart illustrating adjustment processing performed in the distance-measuring system according to Embodiment 1.

First, the adjustment processing will be described. FIG. 3 is a flowchart illustrating adjustment processing according to the embodiment. It should be noted that the processing illustrated in FIG. 3 may be regularly performed at predetermined intervals, or may be performed based on optional triggers. The optional triggers include an operation performed by an operator or detection of a movement of mobile machine 101, for example.

First, image processing device 110 obtains first sensed result 131 obtained by first ranging sensor 102 (S101). Next, range image generator 111 generates first range image 132 using first sensed result 131 (S102). Next, machine detector 112 detects a position of mobile machine 101, based on first range image 132 (S103). For example, mobile machine 101 has a particular portion on which a mark is placed, and machine detector 112 detects the mark. Machine detector 112 determines the detected three-dimensional position as the position of mobile machine 101.

Next, sensor controller 113 controls, based on the position of mobile machine 101 detected by machine detector 112, a detection position (detection range) to be detected by second ranging sensor 103 (S104). Specifically, sensor controller 113 controls pan head 107 of second ranging sensor 103 such that second ranging sensor 103 detects the detected position of mobile machine 101.

Accordingly, when mobile machine 101 moves, distance-measuring system 100 can change an orientation of second ranging sensor 103 such that second ranging sensor 103 detects the position to which mobile machine 101 has moved. With this, it is possible to simplify the adjustment processing. Specifically, safety detection is uninterruptedly performed without a user reinstalling second ranging sensor 103 or changing an orientation of second ranging sensor 103.

Figure 4:
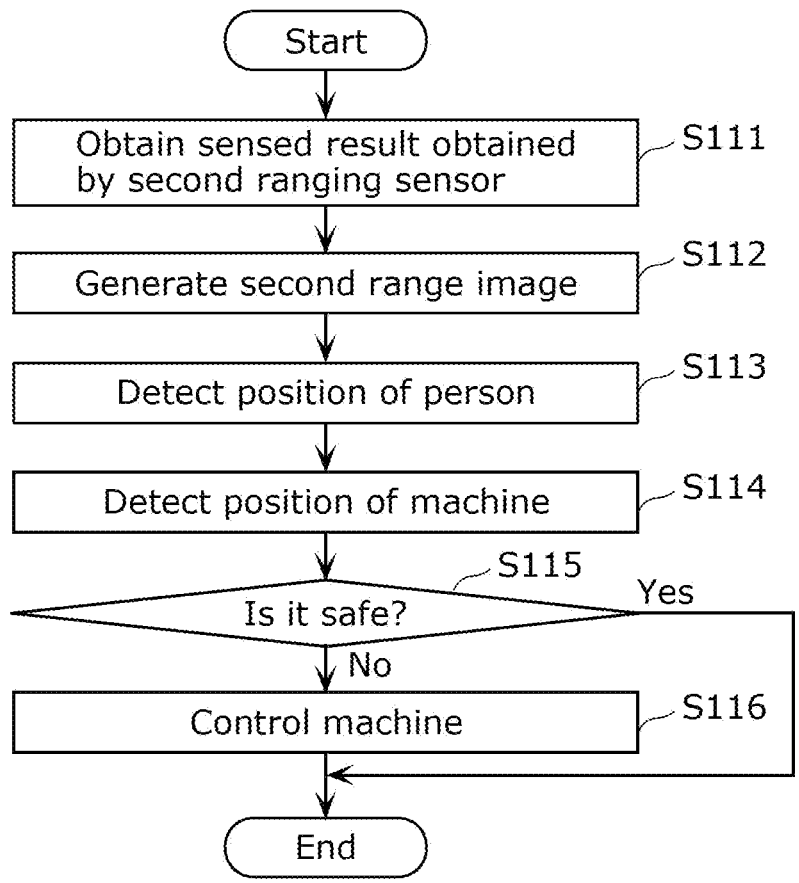
FIG. 4 is a flowchart illustrating safety assessment processing performed in the distance-measuring system according to Embodiment 1.

Next, safety assessment processing that is performed for determining safety based on second sensed result 133 obtained by second ranging sensor 103 on which the adjustment processing has been performed will be described. FIG. 4 is a flowchart illustrating safety assessment processing according to the embodiment.

First, image processing device 110 obtains second sensed result 133 obtained by second ranging sensor 103 (S111). Next, range image generator 114 generates second range image 134 from second sensed result 133 obtained by second ranging sensor 103 (S112).

Next, human detector 122 detects a position of person 104 using second range image 134 (S113). It should be noted that a known technique can be optionally used as a method of detecting the position of a person from a range image.

Next, machine detector 121 detects the position of mobile machine 101 using second range image 134 (S114). For example, machine detector 121 employs the same method employed by machine detector 112. That is, mobile machine 101 has a particular portion on which a mark is placed, and machine detector 121 detects the mark. Machine detector 121 determines the detected three-dimensional position as the position of mobile machine 101.

It should be noted that the processing order of steps S113 and S114 may be optionally determined, and some or all of processes in the foregoing steps may be performed in parallel.

Next, safety determiner 123 determines safety based on the detected position of mobile machine 101 and the detected position of person 104 (S115). Specifically, safety determiner 123 detects a first distance between mobile machine 101 and person 104, based on the position of mobile machine 101 and the position of person 104. Safety determiner 123 determines that the distance between mobile machine 101 and person 104 is unsafe, when the detected first distance is less than a predetermined first value. Safety determiner 123 determines that the distance between mobile machine 101 and person 104 is safe, when the first distance between mobile machine 101 and person 104 is more than or equal to the predetermined first value.

When safety determiner 123 determines that the distance between mobile machine 101 and person 104 is unsafe (No in S115), safety determiner 123 controls operation of mobile machine 101 via machine controller 106 (S116). Specifically, safety detector 115 (i) stops mobile machine 101, (ii) slows down mobile machine 101, or (iii) changes (limits) a movable range of mobile machine 101. On the other hand, when safety determiner 123 determines that the distance between mobile machine 101 and person 104 is safe (Yes in S115), safety determiner 123 terminates the processing without controlling operation of mobile machine 101.

Here, a two-step determination is carried out, but it should be noted that a three-step determination may be carried out. That is, safety determiner 123 may determine that the distance between mobile machine 101 and person 104 is less safe as the distance between mobile machine 101 and person 104 shortens. In this case, safety determiner 123 slows down mobile machine 101 when person 104 comes closer to mobile machine 101, and stops mobile machine 101 when person 104 comes even closer to mobile machine 101. Safety determiner 123 may slow down mobile machine 101 as person 104 comes closer to mobile machine 101, may limit a movable range of mobile machine 101, or may combine these operations.

As has been described above, it is possible to improve safety by detecting that person 104 has come closer to mobile machine 101. In addition, by using second sensed result 133 obtained by second ranging sensor 103 with high precision, it is possible to highly precisely carry out this detection.

Embodiment 2

This embodiment describes a variation of Embodiment 1 above. It should be noted that the following embodiment mainly describes differences from the foregoing embodiment, and thus redundant descriptions may be omitted.

Figure 5:
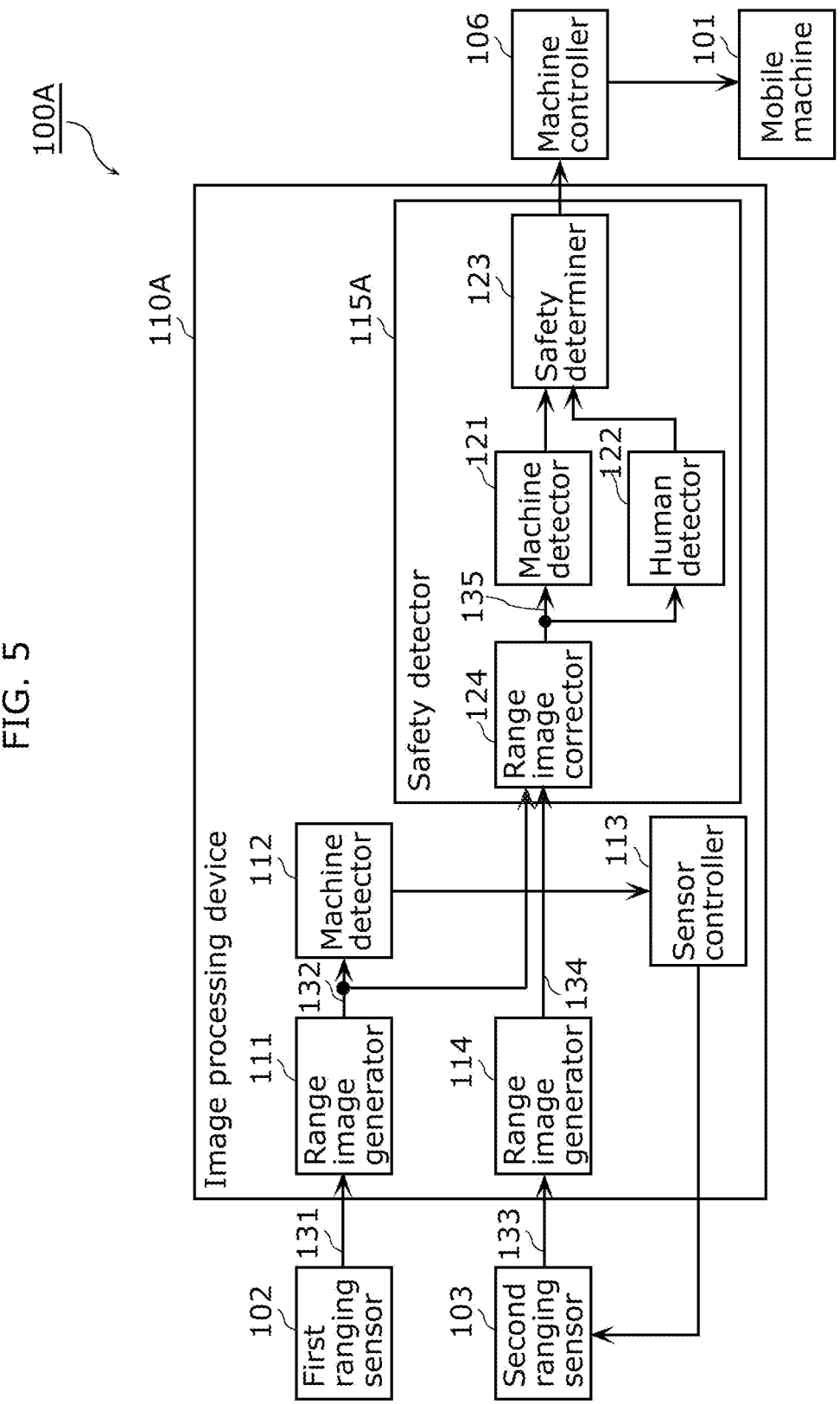
FIG. 5 is a block diagram illustrating a distance-measuring system according to Embodiment 2.

FIG. 5 is a block diagram illustrating a configuration of distance-measuring system 100A according to the embodiment. In distance-measuring system 100A, functions performed by safety detector 115A included in image processing device 110A are different from the functions performed by safety detector 115 illustrated in FIG. 2. Specifically, safety detector 115A further includes range image corrector 124.

Safety detector 115A detects a first distance between mobile machine 101 and person 104, based on first sensed result 131 and second sensed result 133. For example, safety detector 115A selects one of first sensed result 131 and second sensed result 133, based on a degree of reliability of first sensed result 131 and a degree of reliability of second sensed result 133, and detects the first distance, based on selected one of first sensed result 131 and second sensed result 133.

Specifically, range image corrector 124 generates third range image 135 from first range image 132 and second range image 134.

Figure 6:
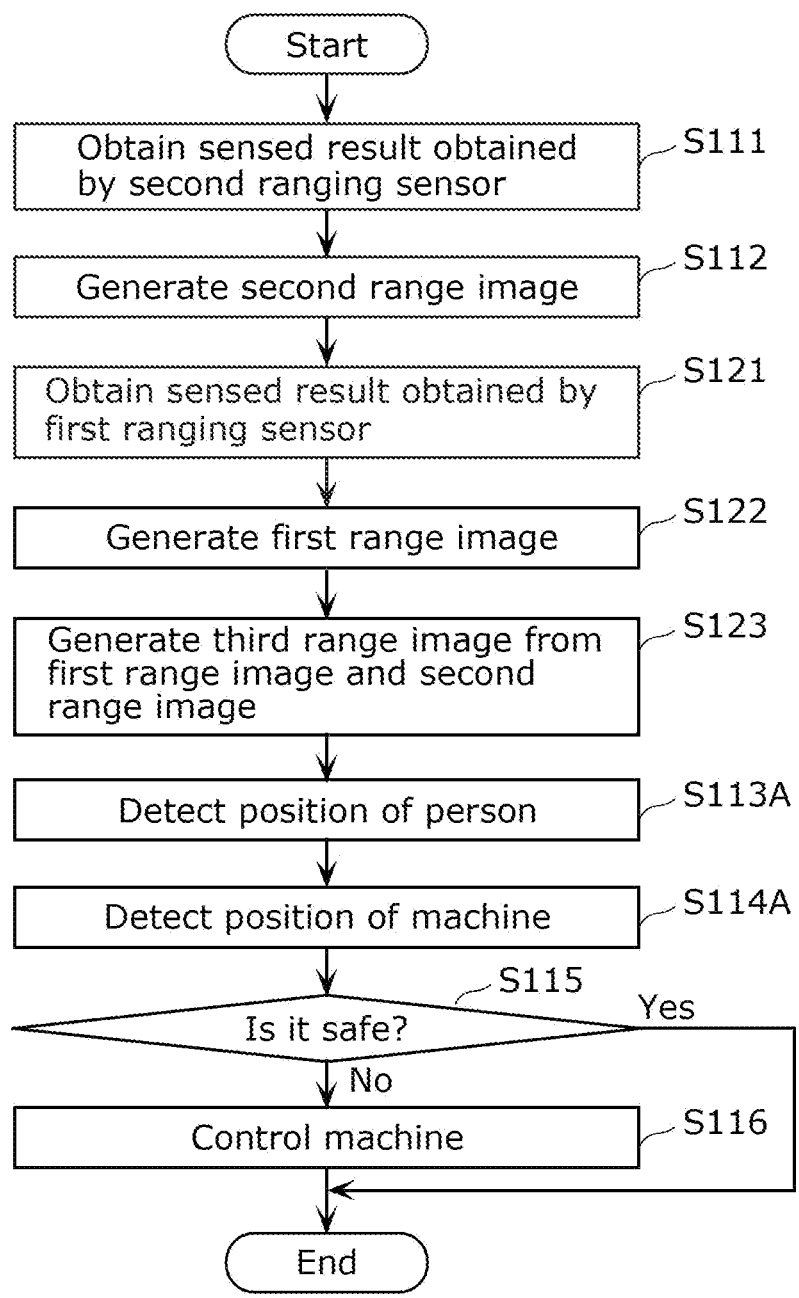
FIG. 6 is a flowchart illustrating safety assessment processing performed in the distance-measuring system according to Embodiment 2.

FIG. 6 is a flowchart illustrating safety assessment processing according to the embodiment. First, image processing device 110A obtains second sensed result 133 obtained by second ranging sensor 103 (S111). Next, range image generator 114 generates second range image 134 from second sensed result 133 obtained by second ranging sensor 103 (S112). In addition, image processing device 110A obtains first sensed result 131 obtained by first ranging sensor 102 (S121). Next, range image generator 111 generates first range image 132 from first sensed result 131 obtained by first ranging sensor 102 (S122).

It should be noted that the processing order of a set of steps S111 and S112 and a set of steps S121 and S122 may be optionally determined, and some or all of processes in the foregoing steps may be performed in parallel.

Next, range image corrector 124 generates third range image 135 from first range image 132 and second range image 134 (S123). Specifically, range image corrector 124 generates third range image 135 by selecting, for each pixel between pixels in first range image 132 and pixels in second range image 134, pixels in an image having a higher degree of reliability. Here, the degree of reliability is, for example, variations in pixel values (range) between frames capturing a still object, and smaller variations have the higher degree of reliability. The degree of reliability is also a difference in pixel values between adjacent pixels, and the degree of reliability is higher for a smaller difference. Moreover, the degree of reliability may be a value based on a combination of the above. In addition, since the precision of second range image 134 is higher than that of first range image 132, the degree of reliability of each pixel may be determined such that the pixels in second range image 134 are more likely to be selected. Moreover, range image corrector 124 may generate pixel values in third range image 135 using pixel values in both first range image 132 and second range image 134, rather than selecting pixel values in one of first range image 132 and second range image 134. For example, range image corrector 124 may calculate pixel values in third range image 135 by performing weighted addition averaging based on the degree of reliability.

Next, human detector 122 detects a position of person 104 using third range image 135 (S113A). Next, machine detector 121 detects a position of mobile machine 101 using third range image 135 (S114A). Except that a range image used is changed from second range image 134 to third range image 135, it should be noted that the processes described above are the same as steps S113 and S114 illustrated in FIG. 4. It should be noted that the processing order of steps S113A and S114A may be optionally determined, and some or all of processes in the foregoing steps may be performed in parallel.

Next, safety determiner 123 determines safety based on the detected position of mobile machine 101 and the detected position of person 104 (S115). It should be noted that subsequent processes to be performed are the same as the processes illustrated in FIG. 4.

As has been described above, the embodiment improves the accuracy of determining safety by using first sensed result 131 obtained by first ranging sensor 102, in addition to second sensed result 133 obtained by second ranging sensor 103.

Embodiment 3

Figure 7:
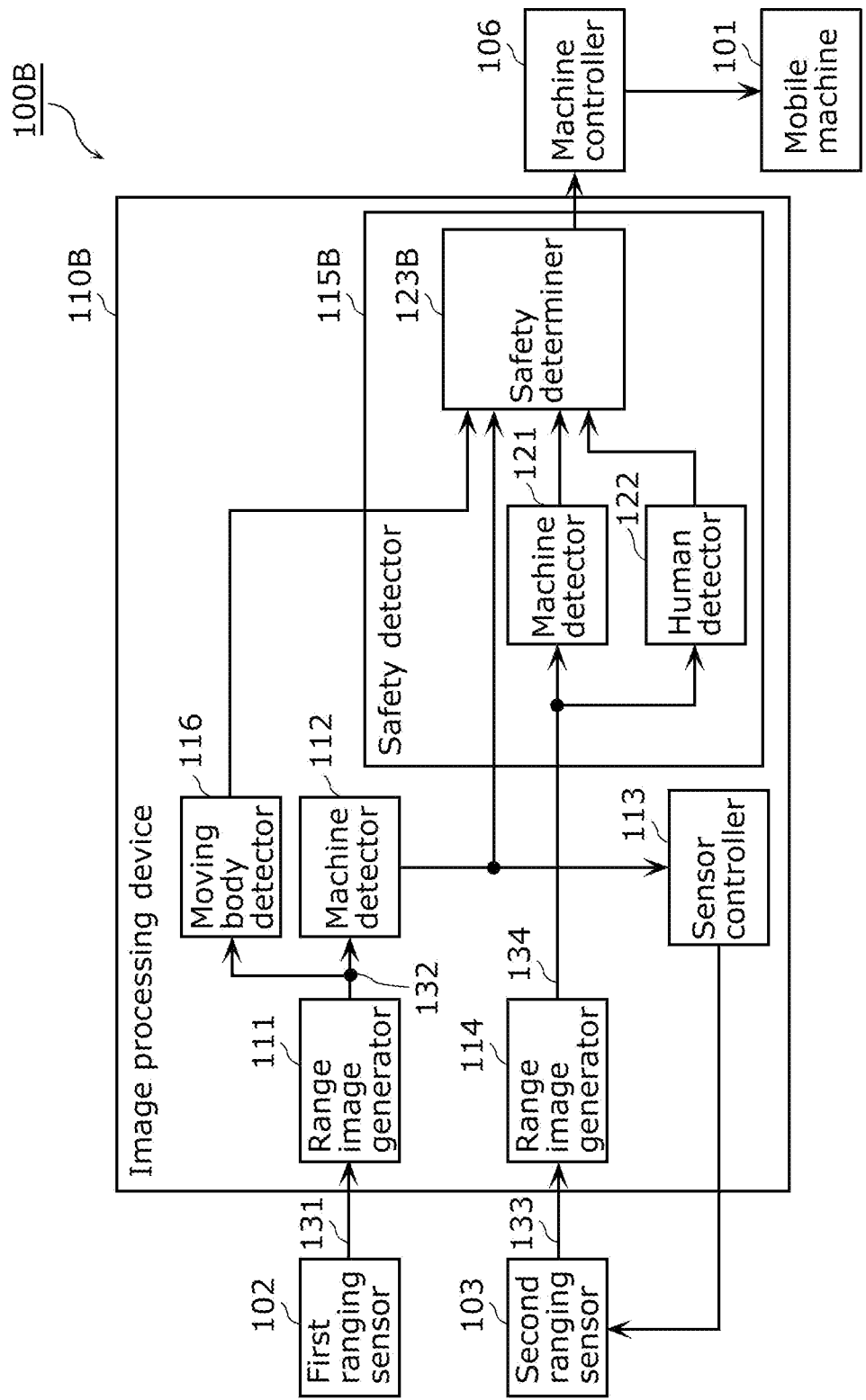
FIG. 7 is a block diagram illustrating a distance-measuring system according to Embodiment 3.

FIG. 7 is a block diagram illustrating a configuration of distance-measuring system 100B according to the embodiment. In distance-measuring system 100B, image processing device 110B further includes moving body detector 116. In addition, functions performed by safety determiner 123B included in safety detector 115B are different from the functions performed by safety determiner 123 illustrated in FIG. 2.

Safety detector 115B further detects a second distance between mobile machine 101 and person 104, based on first sensed result 131. Safety detector 115B changes operation of mobile machine 101, based on a first distance based on second sensed result 133 and the second distance based on first sensed result 131.

Specifically, moving body detector 116 detects the position (three-dimensional position) of a moving body (person), based on first range image 132.

In addition to the position of mobile machine 101 which is detected by machine detector 121 and the position of person 104 which is detected by human detector 122, safety determiner 123B determines safety using the position of mobile machine 101 which is detected by machine detector 112 and the position of person 104 which is detected by moving body detector 116.

Figure 8:
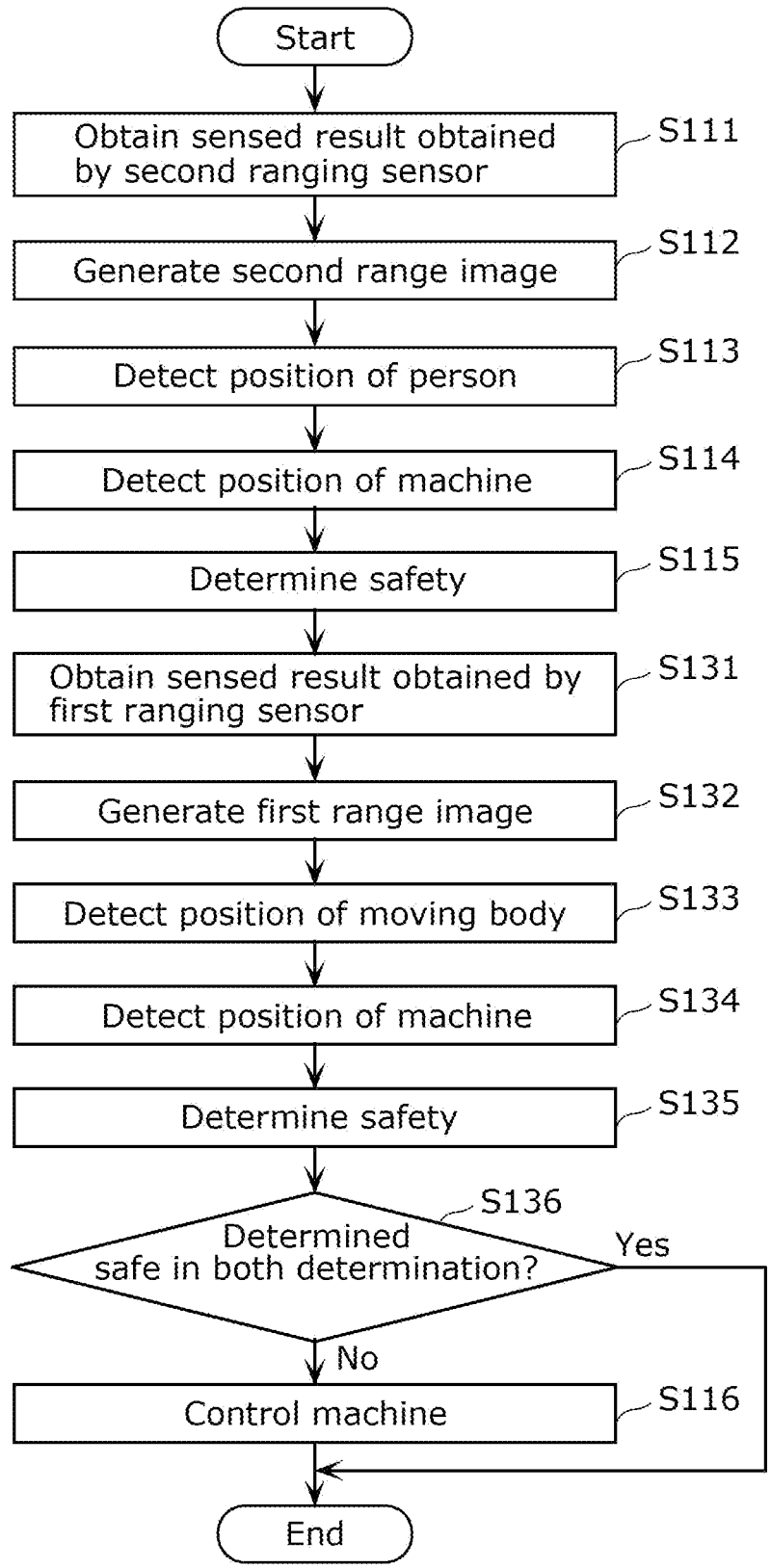
FIG. 8 is a flowchart illustrating safety assessment processing performed in the distance-measuring system according to Embodiment 3.

FIG. 8 is a flowchart illustrating safety assessment processing according to the embodiment. Processes performed in steps S111 through S115 illustrated in FIG. 8 are the same as the processes performed in steps S111 through S115 illustrated in FIG. 4. That is, image processing device 110B obtains second sensed result 133 obtained by second ranging sensor 103 (S111). Next, range image generator 114 generates second range image 134 from second sensed result 133 obtained by second ranging sensor 103 (S112). Next, human detector 122 detects the position of person 104 using second range image 134 (S113). In addition, machine detector 121 detects the position of mobile machine 101 using second range image 134 (S114). Next, safety determiner 123B determines safety, based on the detected position of mobile machine 101 and the detected position of person 104 (S115). For example, safety determiner 123B determines that the distance between mobile machine 101 and person 104 is unsafe, when the first distance between mobile machine 101 and person 104 is less than a predetermined first value. Safety determiner 123B determines that the distance between mobile machine 101 and person 104 is safe, when the first distance between mobile machine 101 and person 104 is more than or equal to the predetermined first value.

In addition, image processing device 110B obtains first sensed result 131 obtained by first ranging sensor 102 (S131). Next, range image generator 111 generates first range image 132 from first sensed result 131 obtained by first ranging sensor 102 (S132).

Next, moving body detector 116 detects the position of a moving body (person) using first range image 132 (S133). In addition, machine detector 112 detects the position of mobile machine 101 using first range image 132 (S134). Next, safety determiner 123B determines safety, based on the detected position of mobile machine 101 and the detected position of the moving body (person 104) (S135). It should be noted that the specific example of this determination is the same as the example provided in step S115, for example. For example, safety determiner 123B determines that the distance between mobile machine 101 and person 104 is unsafe, when the second distance between mobile machine 101 and the moving body (person 104) is less than a predetermined second value. Safety determiner 123B determines that the distance between mobile machine 101 and person 104 is safe, when the second distance between mobile machine 101 and the moving body (person 104) is more than or equal to the predetermined second value. It should be noted that the second value may be the same as or different from the first value used in step S115.

Next, safety determiner 123B determines whether the distance between mobile machine 101 and person 104 is determined safe in both steps S115 and S135 (S136). When safety determiner 123B determines that the distance between mobile machine 101 and person 104 is unsafe in at least one of step S115 and step S135 (No in S136), safety determiner 123B controls operation of mobile machine 101 via machine controller 106 (S116). It should be noted that details of this process are the same as the details described in Embodiment 1, for example. On the other hand, when safety determiner 123B determines that the distance between mobile machine 101 and person 104 is safe in both steps S115 and S135 (Yes in S136), safety determiner 123B terminates the processing without controlling operation of mobile machine 101.

As has been described above, safety is determined using first sensed result 131, in addition to second sensed result 133 in the embodiment. With this, it is possible to improve the accuracy of the determination. Moreover, when at least one of the two determinations made based on the two sensed results is determined unsafe, safety can be improved by limiting operation of mobile machine 101.

It should be noted that although the above has described an example in which the distance between mobile machine 101 and person 104 is determined safe when a determination made based on second sensed result 133 and a determination made based on first sensed result are both determined safe, safety determiner 123B may select a distance that is shorter between a first distance between mobile machine 101 and person 104 which is detected based on second sensed result 133 and a second distance between mobile machine 101 and a moving body (person 104) which is detected based on first sensed result 131, and may determine that the distance between mobile machine 101 and the moving body is safe when the selected distance is more than or equal to a predetermined value, and determine that the distance between mobile machine 101 and the moving body is unsafe when the selected distance is not more than or equal to the predetermined value. Moreover, safety determiner 123B may calculate a third distance that is used for a determination by calculating (e.g. weighted addition averaging) the first distance and the second distance, rather than selecting one of the first distance and the second distance.

In addition, when it requires at least three steps for determining safety, safety determiner 123B may control operation of mobile machine 101, based on a determination result indicating a low safety level compared with other determination results.

Embodiment 4

Figure 9:
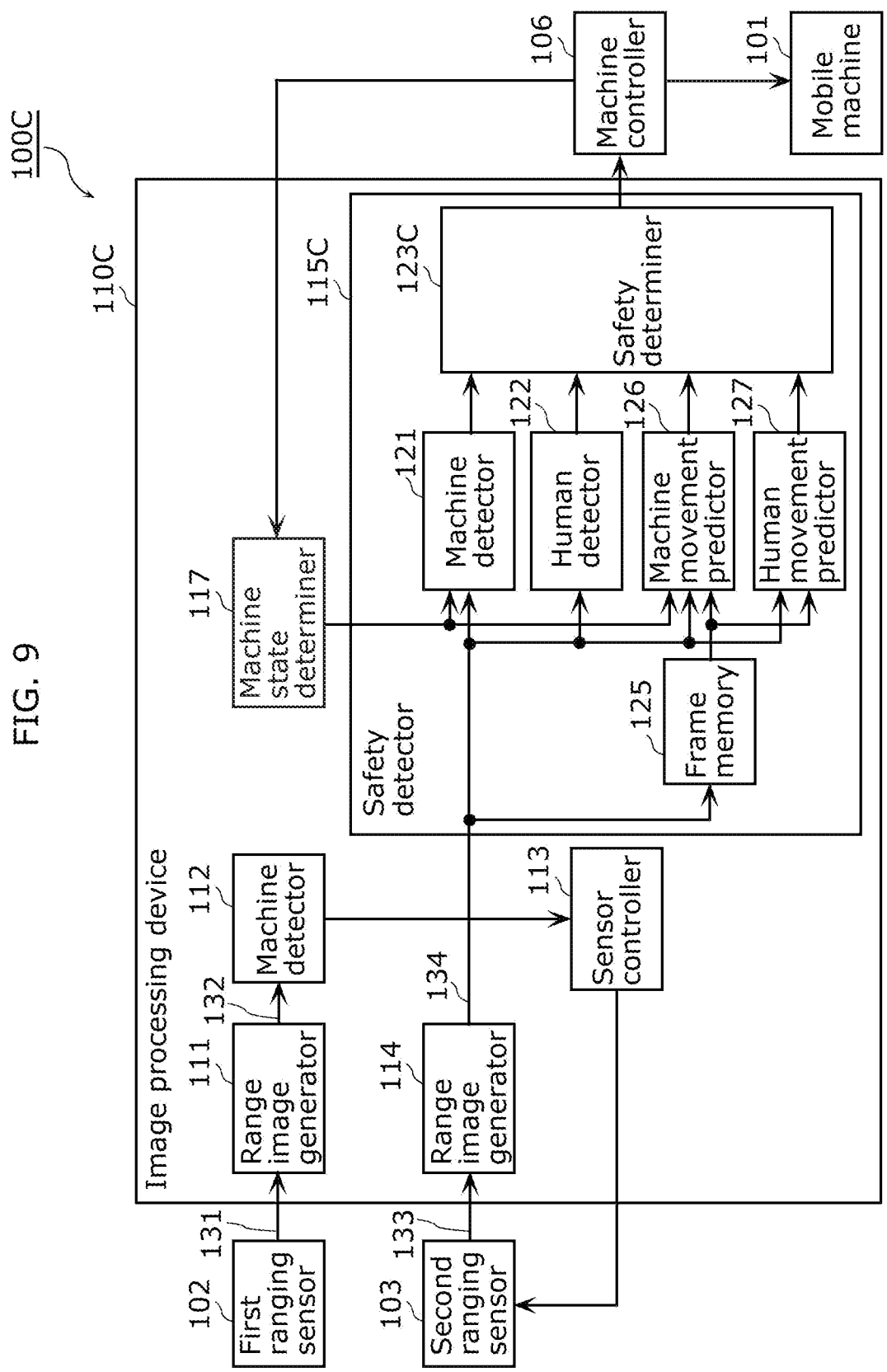
FIG. 9 is a block diagram illustrating a distance-measuring system according to Embodiment 4.

FIG. 9 is a block diagram illustrating a configuration of distance-measuring system 100C according to the embodiment. In distance-measuring system 100C, image processing device 110C further includes machine state determiner 117. In addition, safety detector 115C further includes frame memory 125, machine movement predictor 126, and human movement predictor 127. In addition, functions performed by safety determiner 123C are different from functions performed by safety determiner 123 illustrated in FIG. 2.

Safety detector 115C further predicts a traveling direction of a person, based on a plurality of frames of a plurality of second sensed results 133. Safety detector 115C changes operation of mobile machine 101, based on a first distance between mobile machine 101 and person 104 and the predicted traveling direction of the person.

In addition, safety detector 115C predicts a traveling direction of mobile machine 101, based on the plurality of frames of the plurality of second sensed results 133. Safety detector 115C changes operation of mobile machine 101, based on the first distance between mobile machine 101 and person 104 and the predicted traveling direction of mobile machine 101.

In addition, safety detector 115C corrects the first distance between mobile machine 101 and person 104, based on control information of mobile machine 101, and changes operation of mobile machine 101, based on the corrected first distance.

Specifically, machine state determiner 117 obtains control information indicating the current control state of mobile machine 101. Machine detector 121 corrects the detected position of mobile machine 101, based on the control information obtained by machine state determiner 117. More specifically, machine state determiner 117 retains items of setting information indicating positions of mobile machine 101 according to respective control states of mobile machine 101. For example, each item of the setting information indicates a position of a part of mobile machine 101 in each control state. In addition, as has been described above, the position of mobile machine 101 which is detected based on second range image 134 is a position of a particular portion of mobile machine 101 on which a mark is placed. Accordingly, using the control information, machine detector 121 can calculate positions of parts of mobile machine 101 relative to the position of the particular portion. For example, machine detector 121 calculates the outermost position of mobile machine 101 as a corrected position.

Frame memory 125 retains a plurality of second range images 134 corresponding to the plurality of frames. Machine movement predictor 126 predicts the traveling direction of mobile machine 101, based on the plurality of second range images 134 corresponding to the plurality of frames. It should be noted that machine movement predictor 126 may further predict or correct the traveling direction of mobile machine 101, based on a control state obtained by machine state determiner 117. Human movement predictor 127 predicts the traveling direction of person 104, based on the plurality of second range images 134 corresponding to the plurality of frames.

Safety determiner 123C determines safety based on the position of mobile machine 101 obtained by machine detector 121, the position of person 104 obtained by human detector 122, the traveling direction of mobile machine 101 obtained by machine movement predictor 126, and the traveling direction of person 104 obtained by human movement predictor 127.

Figure 10:
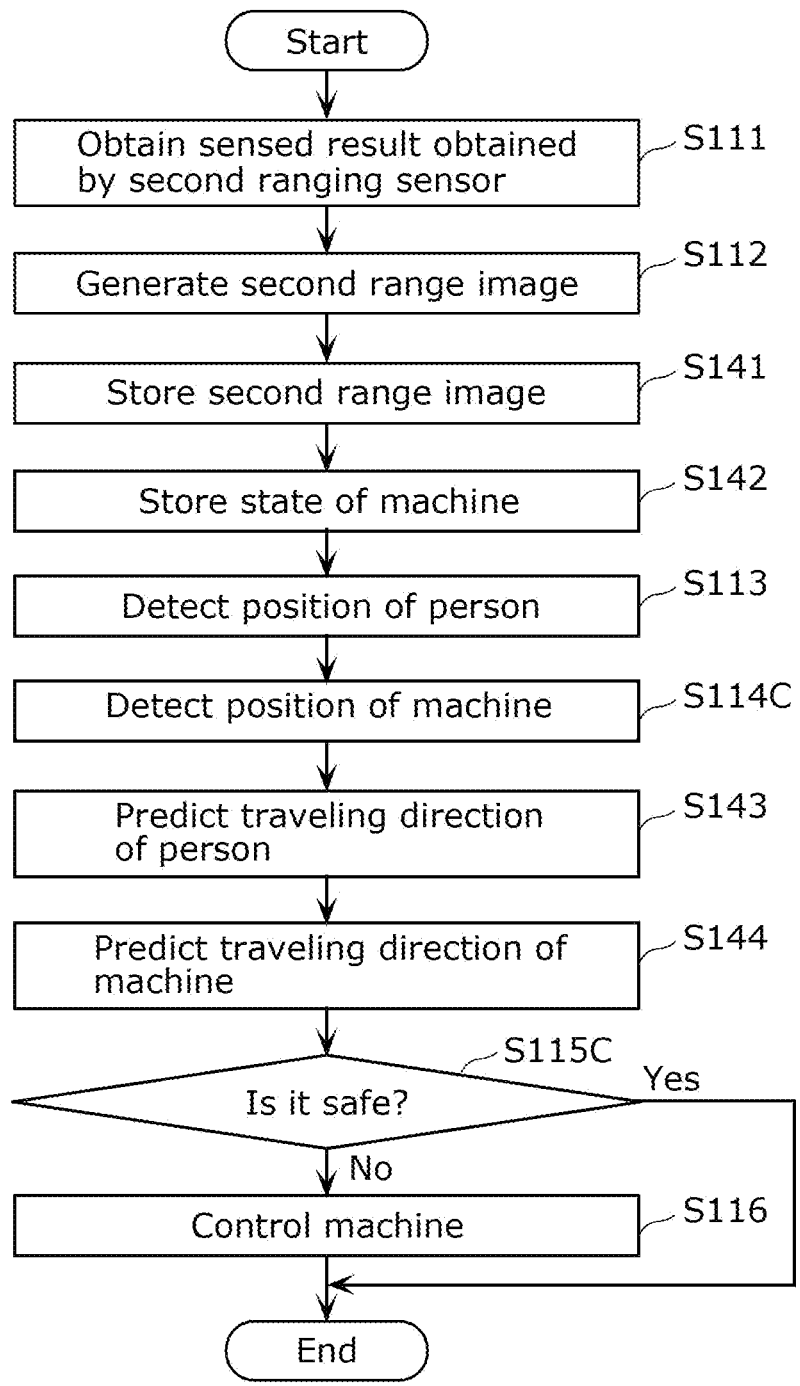
FIG. 10 is a flowchart illustrating safety assessment processing performed in the distance-measuring system according to Embodiment 4.

FIG. 10 is a flowchart illustrating safety assessment processing according to the embodiment. First, image processing device 110C obtains a plurality of second sensed results 133 obtained by second ranging sensor 103 (S111). Next, range image generator 114 generates a plurality of second range images 134 from the plurality of second sensed results 133 obtained by second ranging sensor 103 (S112). Next, frame memory 125 stores the plurality of second range images 134 which have been generated (S141).

Next, machine state determiner 117 obtains control information of mobile machine 101, and determines the control state of mobile machine 101, based on the obtained control information (S142).

Next, human detector 122 detects the position of person 104 using second range image 134 among the plurality of second range images 134 (S113). In addition, machine detector 121 detects the position of mobile machine 101 using second range image 134 among the plurality of second range images 134 (S114C). At this time, machine detector 121 corrects the detected position of mobile machine 101, based on the control state determined in step S142.

Next, human movement predictor 127 predicts the traveling direction of person 104, based on the plurality of second range images 134 corresponding to the plurality of frames which are stored in frame memory 125 (S143). Specifically, human movement predictor 127 predicts the traveling direction and traveling speed of person 104, based on differences among the plurality of second range images 134 corresponding to the plurality of frames.

Next, machine movement predictor 126 predicts the traveling direction of mobile machine 101, based on the plurality of second range images 134 corresponding to the plurality of frames (S144). Specifically, machine movement predictor 126 predicts the traveling direction and traveling speed of mobile machine 101, based on differences among the plurality of second range images 134 corresponding to the plurality of frames.

It should be noted that the processing order of steps S142 through S144 is an example. The processing order of some of processes in steps S142 through S144 may be changed, and some of the processes in the foregoing steps may be performed in parallel.

Next, safety determiner 123C determines safety based on the position of mobile machine 101 obtained by machine detector 121, the position of person 104 obtained by human detector 122, the traveling direction and traveling speed of mobile machine 101 obtained by machine movement predictor 126, and the traveling direction and traveling speed of person 104 obtained by human movement predictor 127 (S115C).

Specifically, safety determiner 123C determines that the distance between mobile machine 101 and person 104 is unsafe, when a first distance between mobile machine 101 and person 104 is less than a predetermined first value. Safety determiner 123C determines that the distance between mobile machine 101 and person 104 is safe, when the first distance between mobile machine 101 and person 104 is more than or equal to the predetermined first value.

In addition, safety determiner 123C performs the determination by taking into account the traveling direction and traveling speed of mobile machine 101 and the traveling direction and traveling speed of person 104. Specifically, when the traveling direction of mobile machine 101 is a direction toward person 104, it is likely to be determined unsafe, and when the traveling direction of mobile machine 101 is a direction away from person 104, it is likely to be determined safe. For example, when the traveling direction of mobile machine 101 is a direction toward person 104, safety determiner 123C decreases a first value, and when the traveling direction of mobile machine 101 is a direction away from person 104, safety determiner 123C increases the first value. In addition, the amount of change in the first value increases as the traveling speed of mobile machine 101 increases.

In addition, when the traveling direction of person 104 is a direction toward mobile machine 101, it is likely to be determined unsafe, and when the traveling direction of person 104 is a direction away from mobile machine 101, it is likely to be determined safe. For example, when the traveling direction of person 104 is a direction toward mobile machine 101, safety determiner 123C decreases the first value, and when the traveling direction of person 104 is a direction away from mobile machine 101, safety determiner 123C increases the first value. In addition, the amount of change in the first value increases as the traveling speed of person 104 increases.

When safety determiner 123C determines that the distance between mobile machine 101 and person 104 is unsafe (No in S115C), safety determiner 123C controls operation of mobile machine 101 via machine controller 106 (S116). It should be noted that details of this process are the same as the details described in Embodiment 1, for example.

As has been described above, the accuracy of determining safety can be improved by taking into account the traveling direction and traveling speed of person 104 and the traveling direction and traveling speed of mobile machine 101 in the embodiment. With this, it is possible to improve safety. In addition, it is also possible to improve working efficiency since unnecessary restriction imposed on operation of mobile machine 101 can be predicted.

It should be noted that although the foregoing has described an example in which both a traveling direction and a traveling speed are used, the traveling direction may only be used.

Embodiment 5

The foregoing embodiments have described mobile machine 101 as movable, and cases in which adjustment processing is performed when mobile machine 101 moves. This embodiment describes a case in which stationary mobile machine 101D is initialized.

Figure 11:
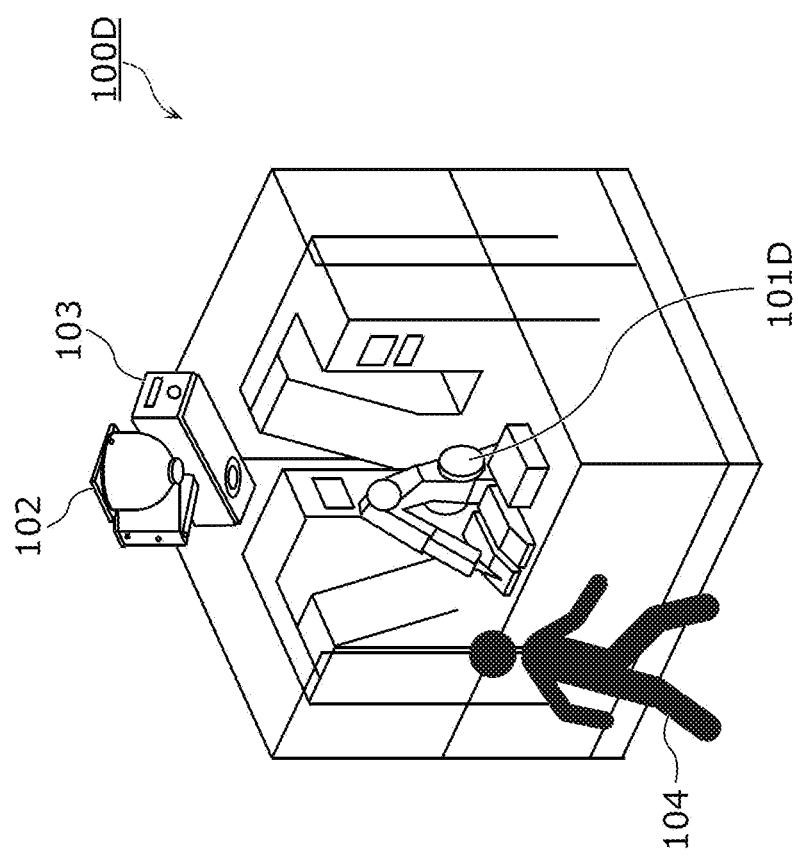
FIG. 11 is a diagram schematically illustrating a configuration of a distance-measuring system according to Embodiment 5.

FIG. 11 is a diagram schematically illustrating a configuration of distance-measuring system 100D according to the embodiment. Distance-measuring system 100D includes mobile machine 101D that is fixedly installed, first ranging sensor 102, and second ranging sensor 103.

Figure 12:
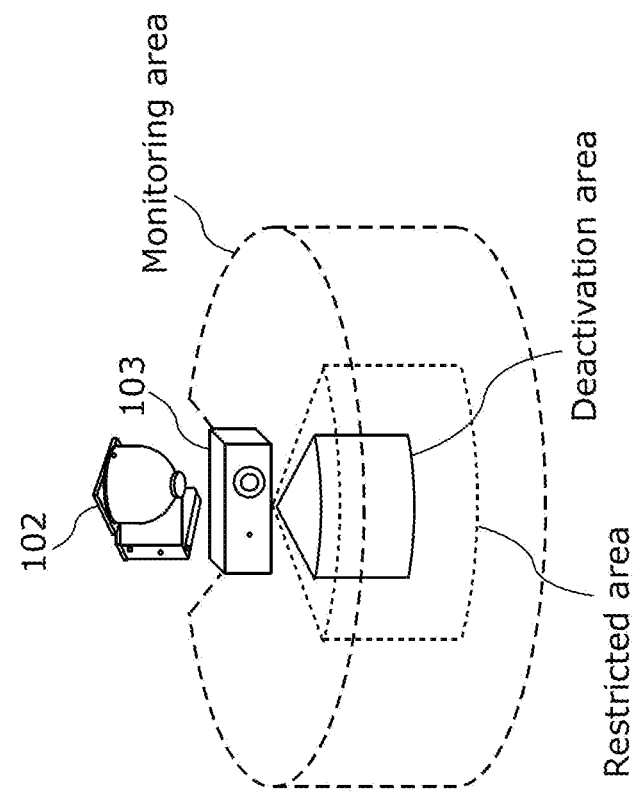
FIG. 12 is a diagram illustrating areas in the distance-measuring system according to Embodiment 5.

FIG. 12 is a diagram illustrated for describing operation of distance-measuring system 100D. FIG. 12 illustrates areas used for safety determinations. A monitoring area illustrated in FIG. 12 is a detection range covered by first ranging sensor 102, and first ranging sensor 102 detects the position of person 104 within the monitoring area. When person 104 enters the restricted area illustrated in FIG. 12, operation of mobile machine 101D is restricted. For example, mobile machine 101D slows down, or a movable range is restricted. In addition, when person 104 enters the deactivation area illustrated in FIG. 12, mobile machine 101D is deactivated. The restricted area and deactivation area are included in a detection range covered by second ranging sensor 103.

Figure 13:
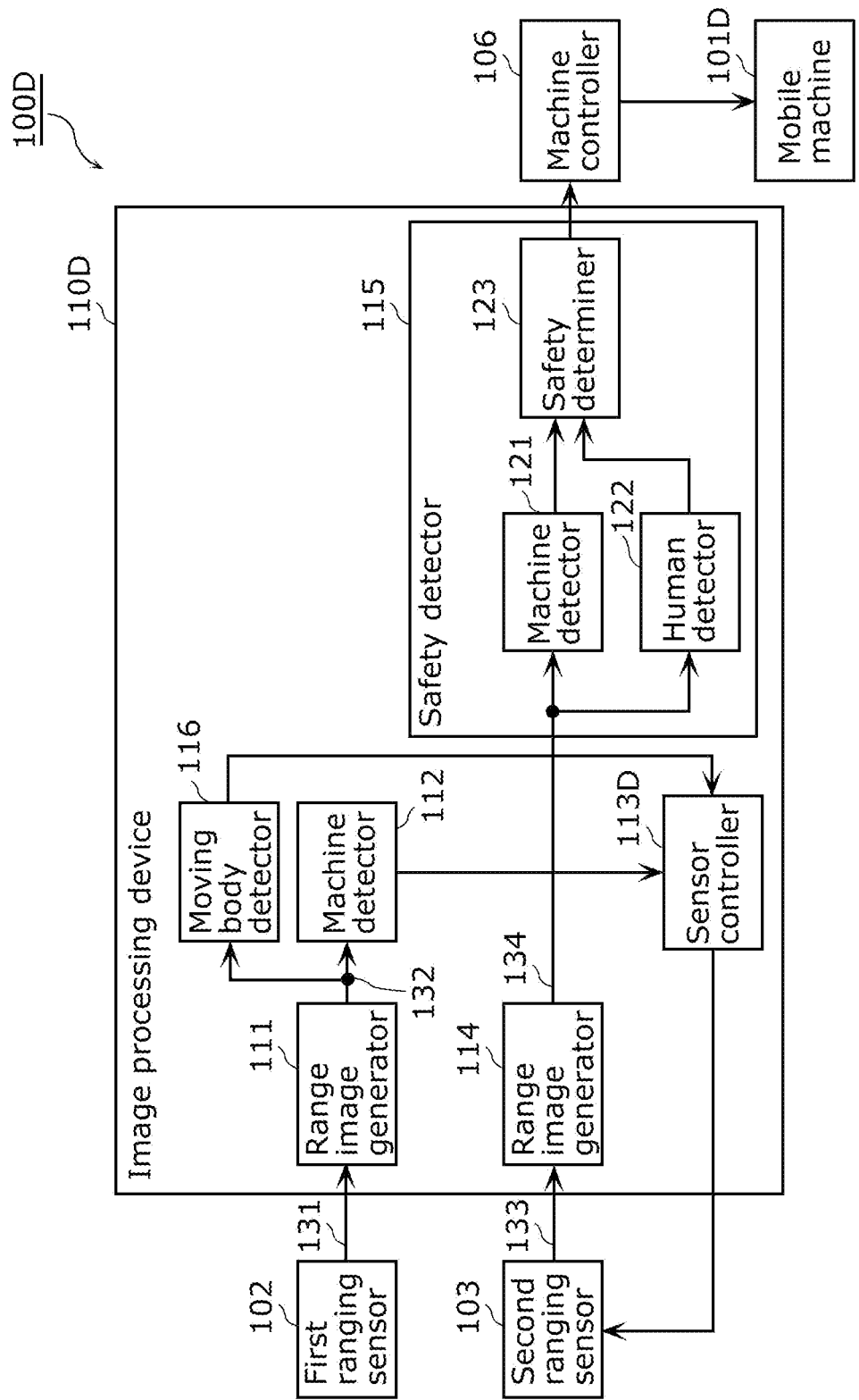
FIG. 13 is a block diagram illustrating the distance-measuring system according to Embodiment 5.

FIG. 13 is a block diagram illustrating a configuration of distance-measuring system 100D according to the embodiment. In distance-measuring system 100D, image processing device 110D further includes moving body detector 116. In addition, functions performed by sensor controller 113D are different from the functions performed by sensor controller 113 illustrated in FIG. 2.

Moving body detector 116 detects the position (three-dimensional position) of a moving body (person), based on first range image 132. Sensor controller 113D controls the detection position to be detected by second ranging sensor 103, based on the detected position of mobile machine 101 and the detected position of the moving body.

In the same manner as distance-measuring system 100 according to Embodiment 1, distance-measuring system 100D performs the adjustment processing (see FIG. 3) and the safety assessment processing (see FIG. 4). It should be noted that since mobile machine 101D is fixedly installed, the adjustment processing illustrated in FIG. 3 is performed at the time of initializing mobile machine 101D. With this, the detection range to be covered by second ranging sensor 103 is automatically adjusted without accurately determining the orientation etc. of second ranging sensor 103 at the time of initializing mobile machine 101D. This simplifies the adjustment processing at the time of initializing mobile machine 101D.

Figure 14:
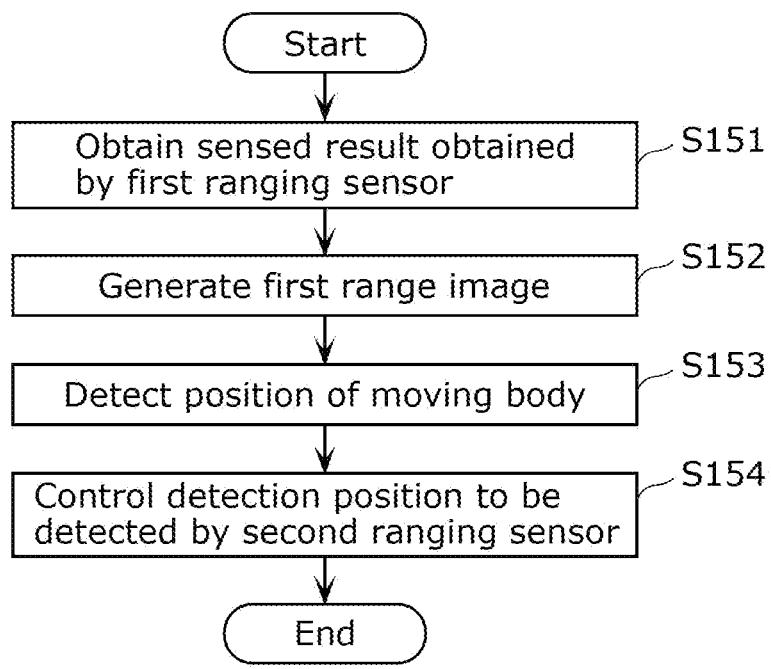
FIG. 14 is a flowchart illustrating adjustment processing performed in the distance-measuring system according to Embodiment 5.

In addition, in the embodiment, the adjustment processing illustrated in FIG. 14 is further performed. Hereinafter, this adjustment processing will be described. The processing illustrated in FIG. 14 is regularly performed at predetermined intervals, for example.

First, image processing device 110D obtains first sensed result 131 obtained by first ranging sensor 102 (S151). Next, range image generator 111 generates first range image 132 from first sensed result 131 obtained by first ranging sensor 102 (S152). Next, moving body detector 116 detects the position of a moving body (person) using first range image 132 (S153).

Next, sensor controller 113D controls the detection position (detection range) to be detected by second ranging sensor 103, based on the position of the moving body detected by moving body detector 116 (S154). Specifically, sensor controller 113D determines whether the detected position of the moving body is included in the current detection range covered by second ranging sensor 103. When the detected position of the moving body is included in the current detection range covered by second ranging sensor 103, sensor controller 113D terminates the processing without changing the detection range covered by second ranging sensor 103. On the other hand, when the detected position of the moving body is not included in the current detection range covered by second ranging sensor 103, sensor controller 113D shifts the detection range covered by second ranging sensor 103 toward a direction in which the detected moving body is present. Alternatively, sensor controller 113D controls second ranging sensor 103 such that the detection range to be covered by second ranging sensor 103 includes the detected position of the moving body and the detected position of mobile machine 101D. For example, sensor controller 113D controls pan head 107 of second ranging sensor 103.

As has been described above, in this embodiment, a detection range covered by second ranging sensor 103 can be dynamically shifted toward a direction in which a moving body (person 104) is present, using first sensed result 131 obtained by first ranging sensor 102. With this, it is possible to readily detect that person 104 has come closer to mobile machine 101D.

In addition, in the case of retrofitting an existing system with a ranging sensor for improving safety, the embodiment allows an addition of a safety detection function by simply installing the ranging sensor without performing precise alignment and adjustment. Moreover, by combining first ranging sensor 102 and second ranging sensor 103, it is possible to detect the presence of people in an extensive area and perform highly accurate gesture detection. This can optimize a restricted area and a deactivation area, thereby improving the productivity of mobile machine 101D.

It should be noted that although the embodiment describes an example in which fixedly installed mobile machine 101D is used, the same processing may be performed by movable mobile machine 101.

Embodiment 6

This embodiment describes a variation of distance-measuring system 100D according to Embodiment 5. It should be noted that the following embodiment mainly describes differences from Embodiment 5, and thus redundant descriptions may be omitted.

In this embodiment, a restricted area and a deactivation area which are normally invisible are made visible using a simple method during the installation of sensors (first ranging sensor 102 and second sensor 103) that detect the vicinity of mobile machine 101D. This makes it possible for a user to readily install the sensors.

In addition, by making the restricted area and deactivation area visible while the sensors are in operation, it is possible to prevent a person from entering the restricted area and deactivation area.

Figure 15:
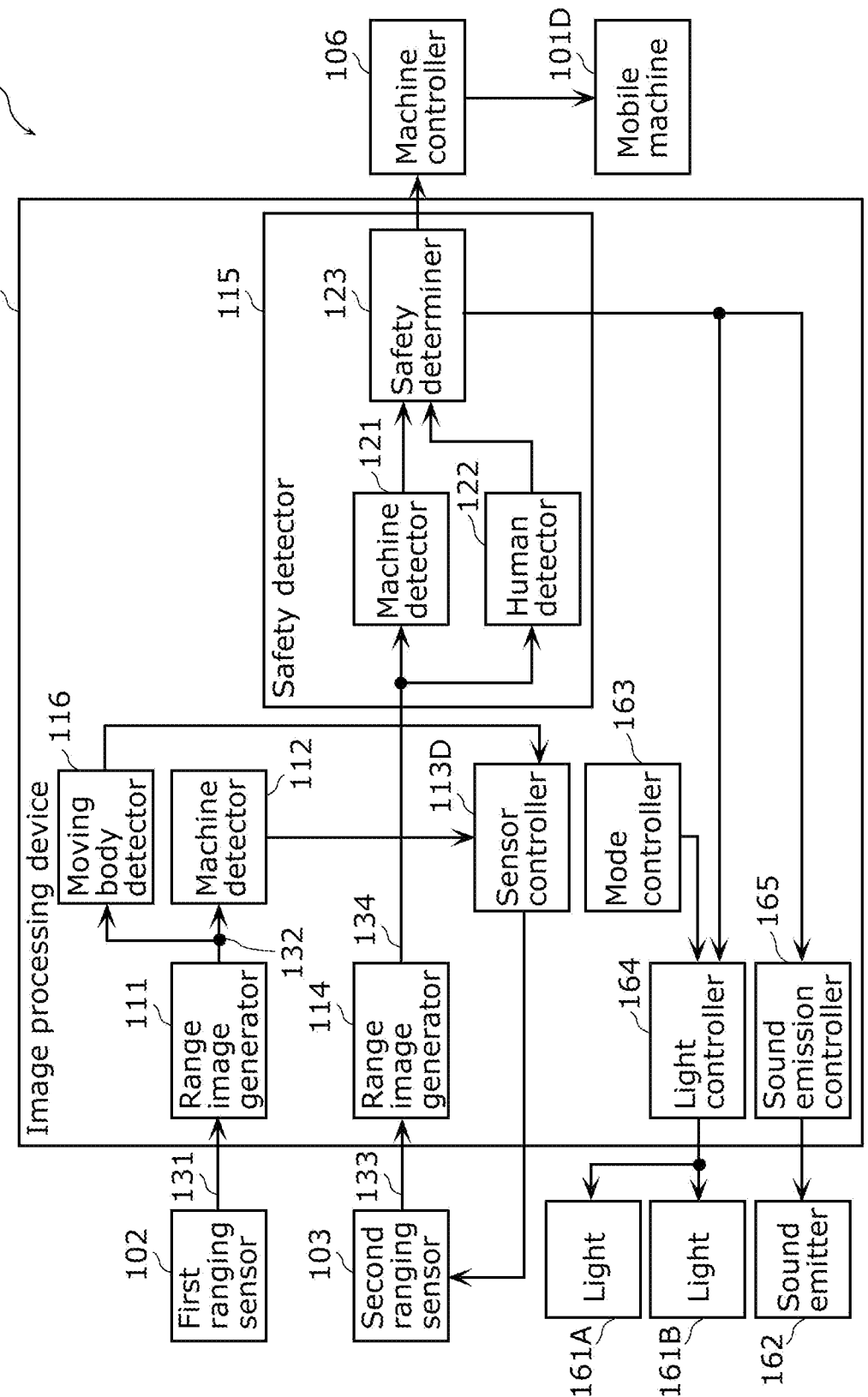
FIG. 15 is a block diagram illustrating a distance-measuring system according to Embodiment 6.

FIG. 15 is a block diagram illustrating a configuration of distance-measuring system 100E according to the embodiment. Distance-measuring system 100E further includes lights 161A and 161B and sound emitter 162. Image processing device 110E further includes mode controller 163, light controller 164, and sound emission controller 165.

Figure 16:
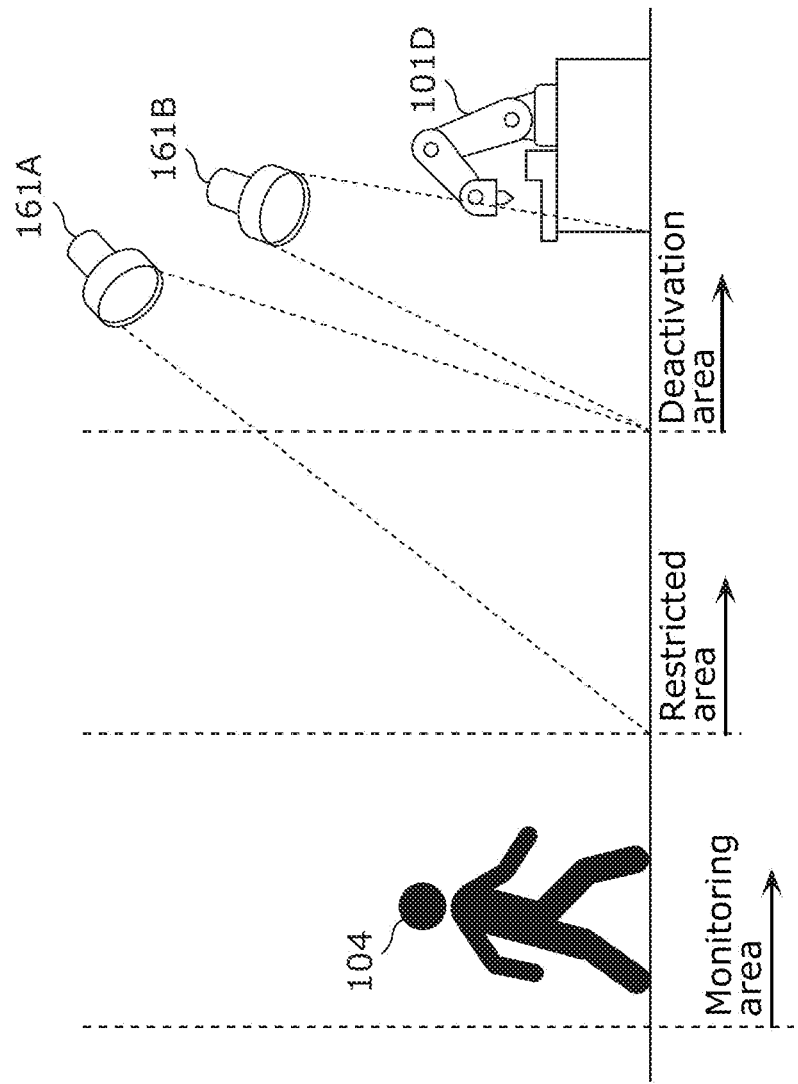
FIG. 16 is a diagram schematically illustrating a configuration of the distance-measuring system according to Embodiment 6.

FIG. 16 is a diagram schematically illustrating a configuration of distance-measuring system 100E according to the embodiment. As illustrated in FIG. 16, light 161A illuminates the restricted area with light. Light 161B illuminates the deactivation area with light.

Sound emitter 162 is a buzzer or a speaker, and emits a warning beep or a warning message.

Mode controller 163 switches between an installation mode for adjusting sensors (first ranging sensor 102 and second ranging sensor 103) and a normal mode for detecting that a person has come closer to mobile machine 101D as has been described above. For example, mode controller 163 switches between the installation mode and the normal mode, based on a user operation.

Light controller 164 turns lights 161A and 161B on and off, and also controls an illumination range illuminated with light. Sound emission controller 165 controls a sound emission such as a warning beep produced by sound emitter 162.

Figure 17:
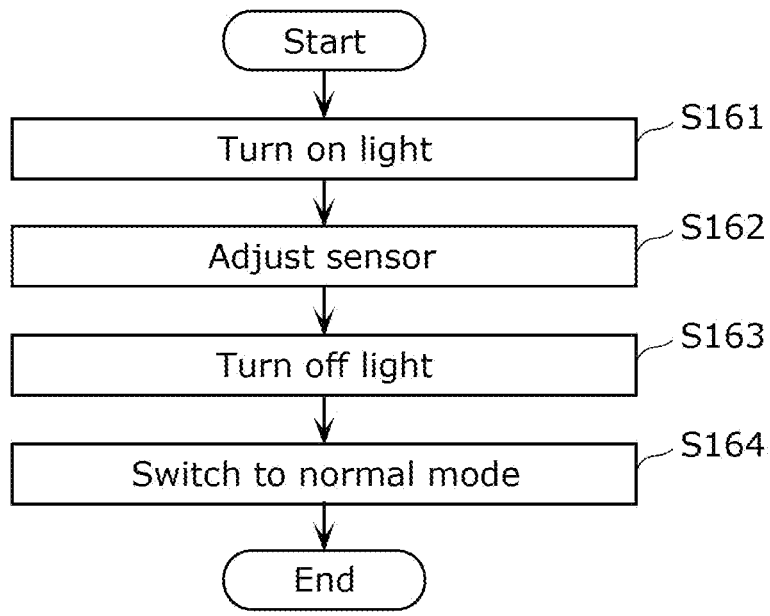
FIG. 17 is a flowchart illustrating operation of the distance-measuring system according to Embodiment 6 during an installation mode.

FIG. 17 is a flowchart illustrating operation of distance-measuring system 100E during the installation mode. In the installation mode, lights 161A and 161B are turned on (S161). At this time, as illustrated in FIG. 16, light 161A and light 161B illuminate the restricted area and the deactivation area with light, respectively. Here, the distance between mobile machine 101D and the restricted area and the distance between mobile machine 101D and the deactivation area are less than a first value. In addition, the first value is a threshold value used for determining safety as has been described in the foregoing embodiments. It is determined unsafe when a first distance between a mobile machine and a person is less than the first value.

Moreover, light 161A and light 161B may emit light having mutually different colors. That is, the restricted area and the deactivation area may be illuminated with light having different colors.

In this state, a user adjusts, for example, an installation angle and an orientation of each of first ranging sensor 102 and second ranging sensor 103 (S162). It should be noted that image processing device 110E may perform these adjustments based on a user input operation.

After these adjustments are completed, light controller 164 turns lights 161A and 161B off (S163). In addition, mode controller 163 switches an operation mode from the installation mode to the normal mode (S164). It should be noted that the completion of the adjustments is determined based on, for example, a user operation.

It should be noted that although the above has described an example in which a user adjusts the sensors by referring to illumination areas, illumination ranges which lights 161A and 161B illuminate may be adjusted first, and then the restricted area and the deactivation area may be determined according to the adjusted illumination ranges.

In addition, light 161A and light 161B may be included in first ranging sensor 102 or second ranging sensor 103.

Figure 18:
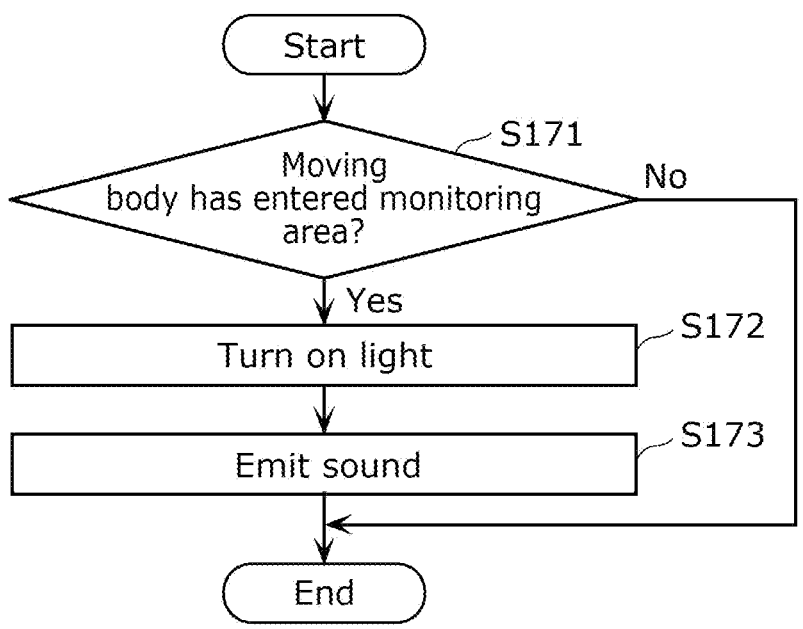
FIG. 18 is a flowchart illustrating operation of the distance-measuring system according to Embodiment 6 during a normal mode.

FIG. 18 is a flowchart illustrating operation of distance-measuring system 100E during a normal mode.

First, Image processing device 110E determines whether a moving body (e.g. person 104) has entered a monitoring area (S171). For this detection, a detection result obtained by moving body detector 116 may be used, for example. In addition, the monitoring area is a detection range covered by first ranging sensor 102. It should be noted that the monitoring area need not correspond to the detection range covered by first ranging sensor 102. The monitoring area may be part of the detection range covered by first ranging sensor 102.

When the moving body enters the monitoring area (Yes in S171), light controller 164 turns lights 161A and 161B on (S172). In addition, sound emission controller 165 controls sound emitter 162 such that sound emitter 162 outputs a warning beep etc. (S173).

It should be noted that operation performed by mobile machine 101 when the moving body enters the restricted area or the deactivation area is the same as the operation described in, for example, Embodiment 5. That is, when the moving body enters the restricted area, operation of mobile machine 101D is restricted, and when the moving body enters the deactivation area, mobile machine 101D is deactivated.

As has been described above, the restricted area and the deactivation area which are normally invisible can be made visible during the installation of sensors (first ranging sensor 102 and second ranging sensor 103) for detecting the vicinity of mobile machine 101D. With this, it is possible for a user to readily install the sensors.

In addition, by making the restricted area and the deactivation area visible while the sensors are in operation, it is possible to prevent a person from entering the restricted area and the deactivation area. With this, it is possible to reduce the decrease in the rate of operation of mobile machine 101D.

The embodiment has described an example in which structural elements are added to the configuration described in Embodiment 5. It should be noted that the same method may be applied to the other embodiments.

In addition, although the above has described an example in which the restricted area and the deactivation area are illuminated with different lights, a single light may illuminate a region including the restricted area and the deactivation area. Moreover, only one of the restricted area and the deactivation area may be illuminated with light.

In addition, although the above has described a case in which the monitoring area is illuminated with light when the moving body enters the monitoring area, the monitoring area may be continuously illuminated with light. Alternatively, light may be emitted or a warning beep may be outputted when the moving body enters the restricted area.

The above has described the distance-measuring systems according to the embodiments of the present disclosure; however, the present disclosure is not limited to the above embodiments.

For example, although the above embodiments have described operation of controlling one mobile machine 101, the distance-measuring systems each may include a plurality of mobile machines 101. In this case, one first ranging sensor 102 and one second ranging sensor 103 may be provided for one mobile machine 101, or one common first ranging sensor 102 may be provided for the plurality of mobile machines 101, along with one second ranging sensor 103 for one mobile machine 101 among the plurality of mobile machines 101.

In addition, the processors each included in the distance-measuring systems according to the embodiments are typically implemented as a large-scale integration (LSI) circuit, which is an integrated circuit. Each of these elements may be individually implemented as a single chip, or a portion or all of the elements may be implemented as a single chip.

Circuit integration is not limited to LSI; the elements each may be implemented as a dedicated circuit or generic processor. A field programmable gate array (FPGA) that is programmable after manufacturing of the LSI circuit, or a reconfigurable processor whose circuit cell connections and settings in the LSI circuit are reconfigurable, may be used.

For example, in the embodiments above, each of the elements may be configured of a dedicated hardware or realized by running a software program suitable for the element. The elements may each be realized by a program executor such as a central processing unit (CPU) or a processor reading and running a software program stored in a recording medium such as a hard disk or a semiconductor memory.

In addition, the present disclosure may be implemented as a device included in the distance-measuring systems. Moreover, the present disclosure may be implemented as a distance-measuring system, or various methods, such as a distance-measuring method or a control method employed by the device included in the distance-measuring systems.

The block diagrams each illustrate one example of the division of functional blocks: a plurality of functional blocks may be implemented as a single functional block, a single functional block may be broken up into a plurality of functional blocks, and part of one function may be transferred to another functional block. Functions of a plurality of functional blocks having similar functions may be processed in parallel or by time-division by a single hardware or software product.

In addition, the configurations of devices included in the distance-measuring systems are mere examples. Instead, a plurality of processes performed in one device may be divided and performed by a plurality of devices, or the plurality of processes performed by the plurality of devices may be performed by a single device.

Moreover, the order in which the steps are executed in the flowcharts are mere examples for presenting specific examples of the present disclosure; the orders are not limited to the illustrated orders. Furthermore, some of the steps may be executed at the same time as (in parallel with) other steps.

The above has described the distance-measuring systems according to one or more embodiments, but the present disclosure is not limited to the above embodiments. Without departing from the scope of the present disclosure, various modifications which may be conceived by a person skilled in the art, and embodiments achieved by combining structural elements in different embodiments may be encompassed within the scope of one or more aspects the present disclosure.

INDUSTRIAL APPLICABILITY

The present disclosure can be applied to a distance-measuring system. For example, the present disclosure can be applied to a system using an industrial robot etc.

REFERENCE SIGNS LIST 100, 100A, 100B, 100C, 100D, 100E distance-measuring system
101, 101D mobile machine
102 first ranging sensor
103 second ranging sensor
104 person
105 restricted area
106 machine controller
107 pan head
108 sensor unit
110, 110A, 110B, 110C, 110D, 110E image processing device 111, 114 range image generator
112, 121 machine detector
113, 113D sensor controller
115, 115A, 115B, 115C safety detector
116 moving body detector
117 machine state determiner
122 human detector
123, 123B, 123C safety determiner
124 range image corrector
125 frame memory
126 machine movement predictor
127 human movement predictor
131 first sensed result
132 first range image
133 second sensed result
134 second range image
135 third range image
161A, 161B light
162 sound emitter
163 mode controller
164 light controller
165 sound emission controller

The invention claimed is:

1. A distance-measuring system, comprising:
a first ranging sensor that detects, for a subject within a first detection range, a distance from the first ranging sensor to the subject;
a second ranging sensor that detects, for a subject within a second detection range more limited than the first detection range, a distance from the second ranging sensor to the subject and has resolution higher than resolution of the first ranging sensor; and
an image processing device, wherein
the image processing device includes:
a machine detector that detects a position of a mobile machine, based on a first sensed result obtained by the first ranging sensor;
a sensor controller that adjusts the second detection range to incorporate the position of the mobile machine detected by the machine detector into the second detection range covered based on the first sensed result obtained by the first ranging sensor; and
a controller that controls the mobile machine, based on a second sensed result obtained by the second ranging sensor.

2. The distance-measuring system according to claim 1, wherein
the controller detects a first distance between the mobile machine and a person, based on the second sensed result, and when the first distance is less than a first value that is predetermined, changes operation of the mobile machine.

3. The distance-measuring system according to claim 2, wherein
when the first distance is less than the first value, the controller (i) stops the mobile machine, (ii) slows down the mobile machine, or (iii) changes a movable range of the mobile machine.

4. The distance-measuring system according to claim 2, wherein
the controller detects the first distance, based on the first sensed result and the second sensed result.

5. The distance-measuring system according to claim 4, wherein
the controller selects, based on a degree of reliability of the first sensed result and a degree of reliability of the second sensed result, one of the first sensed result and the second sensed result, and detects the first distance, based on selected one of the first sensed result and the second sensed result.

6. The distance-measuring system according to claim 2, wherein
the controller detects, based on the first sensed result, a second distance between the mobile machine and the person, and changes operation of the mobile machine, based on the first distance and the second distance.

7. The distance-measuring system according to claim 2, wherein
the second sensed result comprises a plurality of second sensed results, the plurality of second sensed results being a plurality of frames, and
the controller predicts a traveling direction of the person, based on the plurality of frames, and changes operation of the mobile machine, based on the first distance and the traveling direction of the person which has been predicted.

8. The distance-measuring system according to claim 2, wherein
the second sensed result comprises a plurality of second sensed results, the plurality of second sensed results being a plurality of frames, and
the controller predicts a traveling direction of the mobile machine, based on the plurality of frames, and changes operation of the mobile machine, based on the first distance and the traveling direction of the mobile machine which has been predicted.

9. The distance-measuring system according to claim 2, wherein
the controller corrects the first distance, based on control information of the mobile machine, and changes operation of the mobile machine, based on the first distance corrected.

10. The distance-measuring system according to claim 1, wherein
the image processing device further includes a moving body detector that detects a position of a moving body, based on the first sensed result, and
the sensor controller controls, based on the position of the mobile machine which has been detected and the position of the moving body which has been detected, the detection position to be detected by the second ranging sensor.

11. The distance-measuring system according to claim 2 further comprising:
a light that illuminates a range in which a distance from the mobile machine is less than the first value.

12. The distance-measuring system according to claim 11, wherein
the light illuminates the range when a moving body enters a detection range covered by the first ranging sensor.

13. A distance-measuring method, comprising:
detecting, using a machine detector, a position of a mobile machine, based on a first sensed result obtained by a first ranging sensor, the first ranging sensor detecting, for a subject within a first detection range, a distance from the first ranging sensor to the subject;
adjusting the second detection range to incorporate the position of the mobile machine detected by the machine detector into the second detection range based on the first sensed result obtained by the first ranging sensor, the second ranging sensor detecting, for a subject within a second detection range more limited than the first detection range, a distance from the second ranging sensor to the subject and having resolution higher than resolution of the first ranging sensor; and controlling the mobile machine, based on a second sensed result obtained by the second ranging sensor.

14. The distance measuring system according to claim 1, wherein the first ranging sensor is a three-dimensional light detection and ranging (LiDAR) sensor, and the second ranging sensor is a time of flight (TOF) sensor.

15. The distance measuring system according to claim 1, wherein the sensor controller changes a detection direction of the second ranging sensor to incorporate the position of the mobile machine detected by the machine detector into the second detection range.

* * * * *